United States Patent
Schacht Hernandez et al.

(10) Patent No.: US 10,364,386 B2
(45) Date of Patent: Jul. 30, 2019

(54) MICROEMULSION TO IMPROVE THE FLOW OF HEAVY HYDROCARBONS, ITS PREPARATION AND USE

(71) Applicant: INSTITUTO MEXICANO DEL PETROLEO, Mexico City (MX)

(72) Inventors: Persi Schacht Hernandez, Mexico City (MX); Felipe de Jesus Ortega Garcia, Mexico City (MX); Jose Manuel Dominguez Esquivel, Mexico City (MX); Elizabeth Mar Juarez, Mexico City (MX); Jesus Ricardo Ramirez Lopez, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 233 days.

(21) Appl. No.: 14/031,250

(22) Filed: Sep. 19, 2013

(65) Prior Publication Data

US 2014/0083705 A1    Mar. 27, 2014

(30) Foreign Application Priority Data

Sep. 21, 2012   (MX) .......................... A/2012/010896

(51) Int. Cl.
  *E21B 43/16* (2006.01)
  *C09K 8/584* (2006.01)
(52) U.S. Cl.
  CPC .............. *C09K 8/584* (2013.01); *E21B 43/16* (2013.01)
(58) Field of Classification Search
  CPC ...................................................... C09K 8/584
  See application file for complete search history.

(56) References Cited

U.S. PATENT DOCUMENTS

| | | | | |
|---|---|---|---|---|
| 3,373,809 A | * | 3/1968 | Cooke, Jr. | C09K 8/584 166/275 |
| 3,981,361 A | | 9/1976 | Healy | |
| 4,085,797 A | * | 4/1978 | Trantham | C09K 8/58 166/245 |
| 4,110,229 A | * | 8/1978 | Carlin | C09K 8/584 166/270.1 |
| 4,146,499 A | | 3/1979 | Rosano | |
| 4,335,787 A | * | 6/1982 | Stapp | C09K 8/584 166/270.1 |
| 4,557,734 A | | 12/1985 | Schwab et al. | |
| 5,013,462 A | * | 5/1991 | Danley | C09K 3/00 137/13 |
| 5,045,337 A | | 9/1991 | El-Nokaly et al. | |

(Continued)

FOREIGN PATENT DOCUMENTS

DE    2829617    1/1979
EP    0623287    11/1994

OTHER PUBLICATIONS

Sanchez, M.C., Evolucion de las propiedades reologicas de emulsiones aceite vegetal en agua durante el proceso de emulsificacion y almacenamiento, Grasas y Aceites, vol. 51. Fasc. 4 (2000), 230-236 (English abstract).

*Primary Examiner* — Andrew Sue-Ako
(74) *Attorney, Agent, or Firm* — Dickinson Wright, PLLC

(57) ABSTRACT

A microemulsion is formulated with a surfactant, a co-surfactant and brine, for recovery of heavy and extra-heavy crude oils by reducing the viscosity of such crude oils and improving their rheological properties for production and pipeline transportation.

6 Claims, 2 Drawing Sheets

(56) References Cited

U.S. PATENT DOCUMENTS

| | | | |
|---|---|---|---|
| 2005/0085397 A1* | 4/2005 | Hou | C09K 8/584 |
| | | | 507/259 |
| 2008/0302531 A1* | 12/2008 | Berger | C09K 8/584 |
| | | | 166/270.1 |
| 2009/0111717 A1* | 4/2009 | Campbell | C09K 8/584 |
| | | | 507/259 |
| 2014/0083705 A1* | 3/2014 | Schacht Hernandez | |
| | | | C09K 8/584 |
| | | | 166/305.1 |

* cited by examiner

MICROEMULSION TO IMPROVE THE FLOW OF HEAVY HYDROCARBONS, ITS PREPARATION AND USE

CROSS-REFERENCE TO RELATED APPLICATION

This application claims the benefit under 35 U.S.C. § 119 of Mexican Patent Application No. MX/a/2012/010896 filed Sep. 21, 2012, which is hereby incorporated by reference in its entirety.

FIELD OF THE INVENTION

The present invention relates to a microemulsion, its preparation and use for injection into oil reservoirs for enhancing recovery. The invention is directed to a procedure for the preparation of a microemulsion, which is formulated with a surfactant, co-surfactant and brine, in defined proportions. The procedure includes the steps of mixing, agitation, maturation and application, thus allowing the reduction of viscosity of heavy and extra-heavy oils, thus making its transport and handling easier.

BACKGROUND

It is estimated that at the end of a secondary oil recovery process, only about 30% to 40% of original oil reserve is recovered, while the rest of the crude oil is retained in the formation due to a competition process between capillary and viscosity forces.

The recovery of the remaining 60% to 70% can be achieved by unconventional methods that generally are classified as Enhanced Oil Recovery, or EOR, which are used for obtaining any additional production by introducing artificially produced energy within the site. Thus, some processes within this category are water injection, high pressure gas and steam injection, as well as chemicals injection. Other EOR processes and their combinations involve the introduction of additional thermal energy. One of the most effective chemical processes is the injection of surfactants using micellar solutions for micro emulsions formation.

Also, the dispersion of some chemical species are common in the oil recovery processes and they find a wide range of applications to modify the properties of heavy crude oils, thus making it lighter crudes in terms of viscosity and for reducing the level of contaminants like sulfur and metals, which improves the flow overall and makes it to flow easily to the surface.

Micro emulsions are micellar solutions with the characteristics of surfactant type solutions. The degree of applicability will depend on the characteristics of the surfactant and its behavior with respect to some system variables.

Previous works report some methods for micro emulsions preparation, for example European Patent 2 096 411 T3 describes the preparation of a microemulsion as a flavor enhancing agent that does not require any mixing stage for application in the food industry. Also, it favors microemulsion formation of other flavor enhancing mixtures of immiscible foods and triglyceride type oils, together with the interaction of a hydrophilic surface active agent.

U.S. Pat. No. 4,146,499 discloses a method of dispersing an immiscible liquid in the aqueous phase to form a microemulsion. The method includes the stage of selecting a primary surfactant that is amphiphillic, together with a surface active agent that is used in a liquid that is water immiscible, which is dispersed in another liquid that is water immiscible. Thus, a surface active agent in the aqueous phase has to disperse the immiscible liquid, and a secondary surfactant in the aqueous phase is used, which has a HLB (Hydrophilic-Lypophilic-Balance) higher than the parent surfactant.

U.S. Pat. No 4,557,734 discloses production of hybrid micro emulsions of fuel that are prepared from vegetable oil, such as seed of soybean oil, methanol or ethanol, a straight chain isomer of octanol, and optionally, water. It describes the production of fuels using 2-octanol, anhydrous methanol and soybean seed oil. Also, it proposes mixing triolein, different individual alkanols $C_4$-$C_{14}$ and water, to provide a composition which is water tolerant.

U.S. Pat. No. 5,045,337 describes some micro emulsions that are thermodynamically stable, transparent and uniform, which are prepared from a polar solvent, a monoester and a specific di-ester of polyglycerol and a lipid. The microemulsion of this patent contains 90% to 99.8% of a lipid material and approximately 0.1% to 5% of a polar solvent. The polar solvent can be selected from water, glycerol, propylene glycol and di-propylene glycol.

European patent DE 2829617 C2, describes a microemulsion for use in oil recovery methods, especially useful under high salinity water conditions. These include a water mixture that contains an excess of monovalent and di-valent salts, a hydrocarbon, an amphoteric surfactant that contains nitrogen compounds and a co-surfactant agent comprising at least one alcohol with $C_1C_{10}$ chain.

Venezuelan Patent A042819 of October 1985 discloses a method for oil recovery, where a microemulsion with a superior phase or with intermediary phase and an immiscible aqueous phase are simultaneously injected into an underground formation. The viscosity of the injected phase is adjusted in such a way that the relationship between their viscosity and the one for the aqueous phase microemulsion viscosity approaches the brine/oil viscosity ratio of the site.

U.S. Pat. No. 3,981,361 dated Sep. 21, 1976, describes a method for oil recovery from subterranean formations using a micro emulsion, where the surfactant added to the solution is a dodecyl-benzene-sulfonate of xylene monoethanolamine salt and the co-surfactant is a tertiary Amyl alcohol.

SUMMARY OF THE INVENTION

In contrast to prior technologies, the present invention involves the formation and application of a microemulsion formulated with amphiphilic molecules, i.e. having hydrophilic and lipophilic groups in the same molecule for modifying the interfacial tension of heavy hydrocarbons, together with co-surfactant and brine, in defined proportions. The formulation procedure comprises the mixing, agitation, maturation and application, thus affording the viscosity reduction heavy and extra-heavy oils, thus facilitating their transportation through pipelines The process of this invention involves the injection of heavy and extra-heavy crude oil with a displacement agent that is completely miscible in oil. The displacement agent is a microemulsion of a surfactant, a co-surfactant and brine. As a result, the interfacial tension of the crude oil is significantly reduced, while the capillary number tends to infinite values, which means that the predominant forces are not capillary forces (i.e., surface tension inside the pores), but surface forces (i.e., fluid viscosity). Thus, the displacement of oil from the pores in the rock is promoted by the microemulsion-containing displacement agent, which improves the oil mobility from the well. Under ideal conditions, the microemulsion displacing fluid is injected into the well where the microemulsion and oil are mixed in a transition zone in the well, then expand and move through the porous medium, which displaces the oil ahead of the microemulsion as if a piston pushed it.

Thus, the displacement of oil is promoted inside the pores, which are cleared by the microemulsion displacement agent, thus promoting mobility of the oil. Under ideal conditions, the displacing fluid and oil are mixed in a mixing zone or transition zone in the pores of the rock. The microemulsion displacing fluid then expands and moves through the porous medium, which displaces the oil in the pores.

DETAILED DESCRIPTION OF THE INVENTION

Figure 1:
FIG. 1 represents the residual oil trapped in the pores of rocks.

After primary recovery, residual oil remains in the pores of rocks at the site in the form of discontinuous cells, due to capillary action forces. FIG. 1 illustrates this crude.

Figure 2:
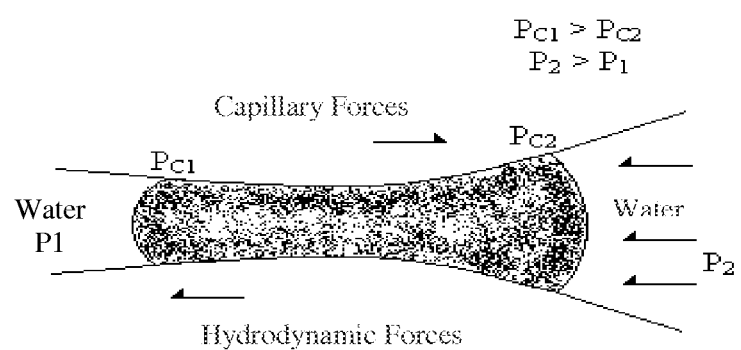
FIG. 2 represents the capillaries and hydrodynamic forces acting on a drop of oil that is trapped in a pore of a rock.

The petroleum remaining within the pores of rocks is in the form of globules that generate a hydrodynamic pressure gradient, which is discontinuous due to capillary forces. This an phenomenon is the result of a competition process between viscous and capillary forces, as shown in FIG. 2.

The present invention relates to a process for the preparation and utilization of a micro-emulsion, which reduces the viscosity of heavy and extra-heavy petroleum oils, facilitating crude oil flow, and increases its mobility and eases its pipeline transport. Such results are achieved by injection of a microemulsion containing a surfactant, which reduces the interfacial tension between oil and water, to an approximate value of 0.001 dynes/cm. The low interfacial tension is needed to overcome the capillary forces that trap the oil, and makes it possible to improve the crude oil mobility. The surfactants are injected in the form of micellar solutions or microemulsions, in order to take advantage of the low Interfacial tension produced in the formation, thus improving the efficiency of the oil displacement.

The invention is also directed to the secondary recovery of heavy crude oil having ° API of 10-12, preferably ° API of 10.5-12, by injecting the microemulsion into the well to form a crude oil emulsion in the pores. The formation of the crude oil emulsion forces the crude oil from the pores.

The microemulsion forms a stable phase, optically clear, i.e., transparent or translucent, with low viscosity and containing a surfactant, and a co-surfactant, such as an alcohol, and brine. The microemulsion is highly miscible in hydrocarbons and forms a homogeneous phase with the hydrocarbon to form an emulsion of the brine and hydrocarbon crude oil at the interface between the microemulsion and the crude oil in the pores.

Preparation of the Microemulsion

The microemulsion preparation includes two stages. The first one is a mixture of the surfactant and the co-surfactant, such as a primary alcohol. Suitable surfactants include , nonyl phenol ethoxylate, sodium dodecyl-benzene-sulfonate, alkylsulfonate of alkylamine, alkylsulfonate of polyalkylamines, alkanolamides, alkanolamines, glycolesters, monoester of ethyleneglycol, polyoxyethylene alcohols, polyoxyethylene alkylamines, polyoxyethylene alkylamides, polyglycerol esters, polyoxyalkylene polyol-esters, sodium carboxymethylcellulose.

A co-surfactant is needed to form a more stable emulsion. This is achieved by the molecular packing properties of compounds, such as alcohols, including those having a medium-chain-length, amines, propylene glycol and alkanolamines. Preferable co-surfactants include primary alcohols, such as methanol, ethanol, propan-1-ol, butan-1-ol, pentan-1-ol, hexan-1-ol, heptan-1-ol, octan-1-ol, nonan-1-ol, decan-1-ol, undecan-1-ol, dodecan-1-ol, tridecan-1-ol, tetradecan-1-ol, pentadecan-1-ol. Preferred primary alcohols, include butanol, and the medium-chain-length alcohols.

Usually, a specific surfactant/co-surfactant ratio is needed. Specific functions of the co-surfactants are: Interfacial tension reduction, fluidity increase in the interfacial film (Ds), a decrease of repulsive interactions between charged head groups, partition between two phases (improved mutual solubility).

The ratio of surfactant to primary alcohol may be, for example, a weight ratio of 10/1 to 1.2/1, preferably between 7/2 and 4/3.

Suitable amounts of surfactant in the mixture based on the total weight of the mixture are between 45 and 80 wt. %, preferably between 65 and 70 wt. % based on the total weight of the surfactant and cosurfactant. Suitable amounts of primary alcohol in the mixture are between 10 and 30 wt. %, preferably between 15 and 25 wt. % based on the total weight of the surfactant and cosurfactant.

Suitable mixing temperatures are between 15° C. and 80° C., preferably between 25° C. and 40° C. The mixture is agitated for 5-90 min, preferably 10-50 min, using an agitation or stirring speed of 200 to 800 rpm until formation of a clear solution. In a second stage, an amount of brine is added with a concentration of 1,000-10,0000 ppm salt, such as NaCl, preferably in the interval 50000-80000 ppm salt, with 70,000 ppm salt being especially preferred, for obtaining a ratio between water and surface active agent of 1:1, preferably 1: 0.4. The agitation continues by stirring at a speed of 100-1000 rpm, preferably 200-800 rpm, for 5-90 min, preferably for 20-50 min, to obtain a clear or perfectly clear solution. Once the solution is crystal clear, it is transferred to a covered container, such as a jar with a lid, where it remains at rest, in a cool place, i.e., at 15-35° C. for 0.5 to 6 h, preferably 1 to 3 h. The container is covered only to avoid dust or airborne contaminants.

The injection of the microemulsion to a well containing heavy oils, which is covered in the present invention, is characterized by its dispersed state at the molecular level and in this form, its interaction with asphaltenic molecules is promoted, thus affording a mobility improvement of the heavy crude oil. The microemulsion is used at the concentration range from 5,000 to 50,000 ppm wt. based on the heavy oil phase, preferably from 5,000 to about 10,000 ppm wt., corresponding to from 0.5 to about 1 wt. % based on the weight of the crude oil. The microemulsion is highly miscible in hydrocarbons and integrates in a homogeneous phase.

EXAMPLES

The following are examples of the microemulsion, its preparation and implementation, without limiting the scope of the present invention.

Example 1

A heavy crude from southeast region of Campeche, Mexico, was used for the tests. This oil presents some properties as reported in Table 1.

A microemulsion was prepared as described above:

The experiments were performed in a reactor batch with a capacity of 500 ml, containing 200 g of 10° API oil and 1 g of microemulsion prepared with the following formulation: 60 wt. % of surfactant(nonyl-phenol ethoxylate), 25 wt. % butyl alcohol and 15% by weight of brine with a concentration of 70,000 ppm weight of anhydrous sodium chloride. The reactor was closed and the ingredients were homogeneously mixed at 300 rpm for 20 minutes at a temperature of 25° C., under atmospheric pressure. The product was subsequently recovered and its viscosity is measured. It is noted that the decline in viscosity is remarkable, namely, from 9720 to 7012 cSt (Example 1), measured at 37.8 ° C. Table 1 shows loads and product viscosities in function of temperature for several crude oils having different API Gravity.

TABLE 1

| Properties | | Crude | Example 1 | Example 2 | Example 3 | Example 4 | Example 5 |
|---|---|---|---|---|---|---|---|
| Gravity (° API) | | 10.5 | 11.8 | 11.5 | 11.0 | 11.5 | 11.0 |
| Viscosity | 37.8° C. | 9720 | 7012 | 6970 | 5628 | 5160 | 4503 |
| (cSt) | 54.4° C. | 2442 | 1951 | 1830 | 1625 | 1586 | 1399 |
| | 82.2° C. | 331 | 321 | 311 | 297 | 252 | 228 |
| | 98.9° C. | 188 | 167 | 159 | 151 | 153 | 139 |

Example 2

In a reactor batch with a capacity of 500 ml, 200 g of 10° API crude oil are placed, together with 1.5 g of a micro emulsion, which was prepared from 65 wt. % of surfactant (sodium dodecyl-benzene-sulfonate), 20 wt. % of methanol and 15% by weight of brine with a concentration of 70,000 ppm. After closing the reactor, homogenous mixing was performed at 300 rpm for 20 min, at a temperature of 25° C. and atmospheric pressure. Subsequently, the product was recovered and its viscosity was determined. It is noted that there is a decline from 9720 to 5628 cSt, measured at 37.8 ° C., as reported in Table 1, which reports the product viscosities of several tests.

Example 3

In a batch type reactor with a capacity of 500 ml, 200 g of a crude oil having 10° API density were placed together with 1.5 g of a microemulsion which was prepared from 55 wt. % of surfactant (sodium dodecyl-benzene-sulfonate), 30 wt. % of methanol and 15% by weight of brine with a concentration of 70,000 ppm. After closing the reactor and homogeneously mixing the contents at 300 rpm for 20 min, at a temperature of 25° C. and atmospheric pressure, the crude oil is recovered and its viscosity is determined. The viscosity of the crude oil was found to decline from 9,720 (before) to 5,628 cSt (after), measured at 37.8° C., as shown in Table 1.

Example 4

In a batch type reactor with capacity of about 500 ml, 200 g of a 10° API density crude oil were introduced, together with 2 g of a microemulsion which was prepared from 50 wt. % of surfactant (sodium dodecyl-benzene-sulfonate), 35 wt. % of methanol and 15% by weight of brine with a concentration of 70,000 ppm. Next, the reactor is closed and its contents is homogeneously mixed at 300 rpm for 20 min, at 25° C. and atmospheric pressure. Subsequently, the product is recovered and its viscosity is determined, which was found to decline from 9,720 to about 5160 cSt, measured at 37.8° C., as shown in Table 1.

Example 5

In a batch type reactor with capacity of 500 ml, 150 g of a 10° API crude oil are placed together with 2.5 g of a micro emulsion, which was made of 60 wt. % surfactant (sodium dodecyl-benzene-sulfonate), 25 wt.% pentan-1-ol and 15% by weight of brine with a concentration of 70,000 ppm weight of anhydrous sodium chloride. Next, the reactor is closed and its contents homogeneously mixed at 300 rpm for 20 min. at of 25° C. and atmospheric pressure Subsequently, the product is recovered and its viscosity is determined, which indicates a decline from 9,720 to 4,503 cSt, measured at 37.8° C., as shown in Table 1.

What is claimed is:

1. A process for the secondary recovery of heavy crude oil having an ° API gravity of 10-12 from a well consisting of the steps of producing a micellar solution consisting of a surfactant, a primary alcohol, and about 15 by weight of a brine solution containing 70,000 ppm sodium chloride salt;

injecting the micellar solution into the well in an amount of about 0.5 to 1 wt % based on the weight of the crude oil in said well to mix with the crude oil in the well, forming a crude oil microemulsion in the well of said crude oil and said micellar solution, and reducing the viscosity and surface tension of the crude oil in the well to about 0.001 dyne/cm, and recovering said crude oil;

wherein said surfactant is nonyl phenol ethoxylate, and said primary alcohol co-surfactant is selected from the group consisting of methanol, ethanol, propan-1-ol, butan-1-ol, pentan-1-ol, hexan-1-ol, heptan-1-ol, octan-1-ol, nonan-1-ol, decan-1-ol, undecan-1-ol, dodecan-1-ol, tridecan-1-ol, tetradecan-1-ol, and pentadecan-1-ol;

a ratio of said surfactant to said primary alcohol co-surfactant is between 7:2 and 4:3.

2. The process of claim 1, where said micellar solution consists of 60 wt % nonyl phenol ethoxylate, 25 wt % butyl alcohol, and 15 wt % brine containing 70,000 ppm sodium chloride.

3. The process of claim 1, wherein said mixture of said surfactant and said primary alcohol co-surfactant includes 65-70 wt % of said surfactant.

4. The process of claim 1, wherein said primary alcohol is butanol.

5. The process of claim 1, wherein said micellar solution of said surfactant and said primary alcohol is prepared under agitation to form a first solution, and said brine is added to said first solution under continuous stirring to form a second solution, and allowing said second solution to rest to obtain said micellar solution.

6. The process of claim 5, wherein said surfactant and primary alcohol are agitated for 10-50 minutes at 200-800 ppm.

* * * * *